United States Patent
Cecchi et al.

(10) Patent No.: US 6,532,081 B1
(45) Date of Patent: Mar. 11, 2003

(54) WEIGHT CALCULATION FOR BLENDING COLOR TRANSFORMATION LOOKUP TABLES

(75) Inventors: Ann M. Cecchi, Webster, NY (US); Katherine Loj, Rochester, NY (US); Clara Cuciurean-Zapan, Fairport, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/360,101

(22) Filed: Jul. 23, 1999

(51) Int. Cl.[7] .................. G06F 15/00; G06K 15/00; G06K 9/00; G03F 3/08; H04N 1/46

(52) U.S. Cl. .................. 358/1.9; 358/518; 358/3.23; 358/523; 358/524; 358/525; 382/162; 382/167

(58) Field of Search .................. 358/1.9, 518, 3.23, 358/523, 524, 525; 382/162, 167

(56) References Cited

U.S. PATENT DOCUMENTS

| | | |
|---|---|---|
| 5,204,665 A | 4/1993 | Bollman et al. |
| 5,387,985 A | 2/1995 | Loce et al. |
| 5,438,649 A | 8/1995 | Ruetz |
| 5,471,324 A | 11/1995 | Rolleston |
| 5,483,360 A | 1/1996 | Rolleston et al. |
| 5,510,910 A | 4/1996 | Bockman et al. |
| 5,583,666 A | 12/1996 | Ellson et al. |
| 5,689,343 A | 11/1997 | Loce et al. |
| 5,696,845 A | 12/1997 | Loce et al. |
| 5,729,664 A | 3/1998 | Ishikawa |
| 5,734,802 A | 3/1998 | Maltz et al. |
| 5,754,710 A | 5/1998 | Sekine et al. |

OTHER PUBLICATIONS

"A Comparison of Techniques for Color Gamut Mismatch Compensation", (Journal of Imaging Technology, vol. 16, No. 5, Oct., 1990), R. S. Gentile, E. Walowit and J.P. Allebach.

Primary Examiner—Edward Coles
Assistant Examiner—Monica Mitchell
(74) Attorney, Agent, or Firm—Fay, Sharpe, Fagan, Minnich & McKee, LLP (57) ABSTRACT

For blending two color transformation look-up tables, the weights used for combining the tables are designed such that transitions from one look-up table to another are smooth and do not create objectionable artifacts. Building the individual weights includes obtaining the position of a given input point from the input color space, both in the input device and an output device gamut. Weight calculation is obtained by (1) if the input color falls in the intersection of predefined percentages of both the input gamut and the output gamut, then a pictorial LUT is used and the weight is set to 1.0; (2) if the input color falls outside the input and/or output gamut, then a graphics LUT is used and the weight is set to 1.0, but if the input color is inside the predefined percentage of the output gamut and anywhere inside the input gamut, a weight is calculated according to the position of the input color relative to the input gamut; (3) if the input color is inside the output gamut but outside the predefined percentage of the output gamut, and inside the input gamut, a test is used to determine if the input color is in the predefined percentage of the input gamut. When the restrictions of (3) are met, a weight is calculated according to the position of the input color relative to the output gamut; however when the restrictions of (3) are not met a weight is calculated according to the position of the input color relative to both the input and output gamut.

11 Claims, 4 Drawing Sheets

| Gcrt \ Gpr | In Gamut | Out of Gamut |
|---|---|---|
| Out of Gamut | | Blended LUT |
| In Gamut | | Pictorial LUT |

Gcrt = Monitor Gamut
Gpr = Printer Gamut

FIG. 4

| Gcrt \ Gpr | Out of Gamut | In 100%...P2% (excluding P2) | In P2% of Gamut |
|---|---|---|---|
| Out of Gamut | Graphics LUT | Graphics LUT | Graphics LUT |
| In 100%...P1% (excluding P1) | Graphics LUT | Blended LUT W1 Weighting | Blended LUT W3 Weighting |
| In P1% of Gamut | Graphics LUT | Blended LUT W2 Weighting | Pictorial LUT |

FIG. 5

WEIGHT CALCULATION FOR BLENDING COLOR TRANSFORMATION LOOKUP TABLES

FIELD OF THE INVENTION

The present invention relates to the art of document reproduction. It finds particular application in conjunction with printer reproduction of color image signals having both pictorial and graphical elements.

BACKGROUND OF THE INVENTION

The following patents are specifically incorporated by reference: U.S. Pat. No. 5,734,802 to Maltz et al. for its teaching of a blended look-up table for printing images with both pictorial and graphical elements; U.S. Pat. No. 5,483,360 to Rolleston et al. for teaching a color printer calibration with blended look-up tables; U.S. Pat. No. 5,471,324 to R. Rolleston for teaching a color printer calibration with improved color mapping linearity; U.S. Pat. No. 5,699,491, to R. Barzel for its teaching of a printer driver having gamut mapped colors.

The generation of color documents can be thought of as a two step process. In the first step, image signals (such as Red, Green and Blue in a RGB color space) representative of the image are produced by a scanner, work station or other image generating device. Thereafter, a printer, copier or other output device receives the image signals, converts them to printer or output signals (such as Cyan, Magenta, Yellow, or Black in a CMYK color space), and generates a reproduction. One problem with color reproduction is that devices have different characteristics. For example, print capabilities and colorants for printers are uniquely defined. As a result, a select image signal, when converted into a printer signal, may produce differing colors when printed by separate printers. To overcome this problem each printer is provided with a unique look-up table (LUT) for converting image signals into proper printer signals.

Each printer can print a limited range of colors ("gamut") as faithful reproductions of the intended color. Typically, colors for scanned images, for example pictorial scenes, as opposed to colors for images generated by the work station, correspond to a portion of the printer's available color gamut. These colors can be faithfully transformed into printer signals by a LUT that has been determined to accomplish a calorimetric match with the color intended by the user. In other words, scanned image signals for most colors are within "the gamut" of the printer.

However, certain image signals, such as those relating to the colors of computer generated graphics, are outside of the gamut of the printer and cannot be reproduced faithfully; typically, computer generated colors are more saturated. Computer-generated, saturated colors cannot be faithfully reproduced within the gamut of the printer, therefore reproduction of such colors requires special translation, via a specially determined LUT, of the image signals into printer signals before printing. Typical examples of such colors are work station generated line art, bar graphs, or text.

As noted, "pictorial" image signals such as from a scanner or "graphical" image signals such as from a work station must be translated into an output, e.g. printer format, prior to being printed. in known systems, the translation is achieved using either a pictorial LUT or a graphical LUT. Both LUTs are held in a printer color conversion memory and are used depending on the type of signal to be translated, i.e., whether it is a pictorial image signal or a graphical image signal. Pictorial LUTs translate scanned image signals. Graphical LUTs translate saturated graphical RGB image signals into the most fully saturated colors the printer is capable of making. Graphical LUTs cannot be used to translate pictorial image signals, and, conversely, pictorial LUTs cannot translate graphical image signals, because they would generate numerous objectionable artifacts or unacceptable color reproduction.

While the foregoing designs have achieved successful reproductions, some image signals may be "mixed", containing both graphical and pictorial elements. Some of these image signals are outside the gamut of a printer and cannot be translated into printer signals using merely the pictorial LUT. Likewise, the graphical LUT does not provide proper translation of these images signals into printer signals since the graphical LUT is merely directed towards fully saturated image signals.

Prior art solutions to this problem involve generating a blended look-up table, or alternatively compressing or clipping mixed image signals that are outside the range of the printer gamut into image signals fully convertible by the pictorial LUT. The prior art techniques of generating a blended look-up table, however, fail to generate satisfactory weights which are used in the blended look-up table, and therefore, outputs of existing blending systems generate undesirable artifacts and contours.

It is therefore desirable to provide a new and improved technique for building or generating weights which are used when blending pictorial and graphical color transformation look-up tables. It is therefore further desirable that weight building is designed in such a manner that transitions from one look-up table to another are smooth and do not create objectionable artifacts.

SUMMARY OF THE INVENTION

According to one aspect of the present invention, a method is provided for building weights used in the generation of a blended look-up table (LUT) which translates an image signal having both pictorial and graphical elements, into an output signal.

Weights are obtained by determining a position of a given input point from an input color space for both an input device gamut and an output device gamut. When the input point is located in the intersection of predefined percentages of the input device gamut and the output device gamut, the weight for the input point is set to a first predefined value. If the input point is outside at least one of the input device gamut and the output device gamut, the weight of the input point is set to a second predefined value. When the input point is within the predefined percentage of the output device gamut and anywhere inside the input device gamut, the weight of the input point is calculated according to the position of the input point relative to the input device gamut.

A determination is then made as to whether the input point is (i) within the output device gamut, (ii) outside a predefined percentage of the output device gamut, and (iii) inside the input device gamut. Next a test is undertaken to determine if the input point is in a predefined percentage of the input device gamut, when the previous step has determined the input point is in (i), (ii), and (iii), as described.

The weight is calculated according to the position of the input point relative to the output device gamut, when the testing determined the input point is in the predefined percentage of the input device gamut. Alternatively, the weight is calculated according to the position of the input point relative to both the input device gamut and the output device gamut, when the testing step determines the input point is outside the predefined percentage of the input device gamut.

BRIEF DESCRIPTION OF THE DRAWINGS

The invention may take form in various components and arrangements of components, and in various steps and arrangements of steps. The drawings are only for purposes of illustrating preferred embodiments and are not to be constructed as limiting the invention.

DETAILED DESCRIPTION OF THE PREFERRED EMBODIMENTS

Figure 1:
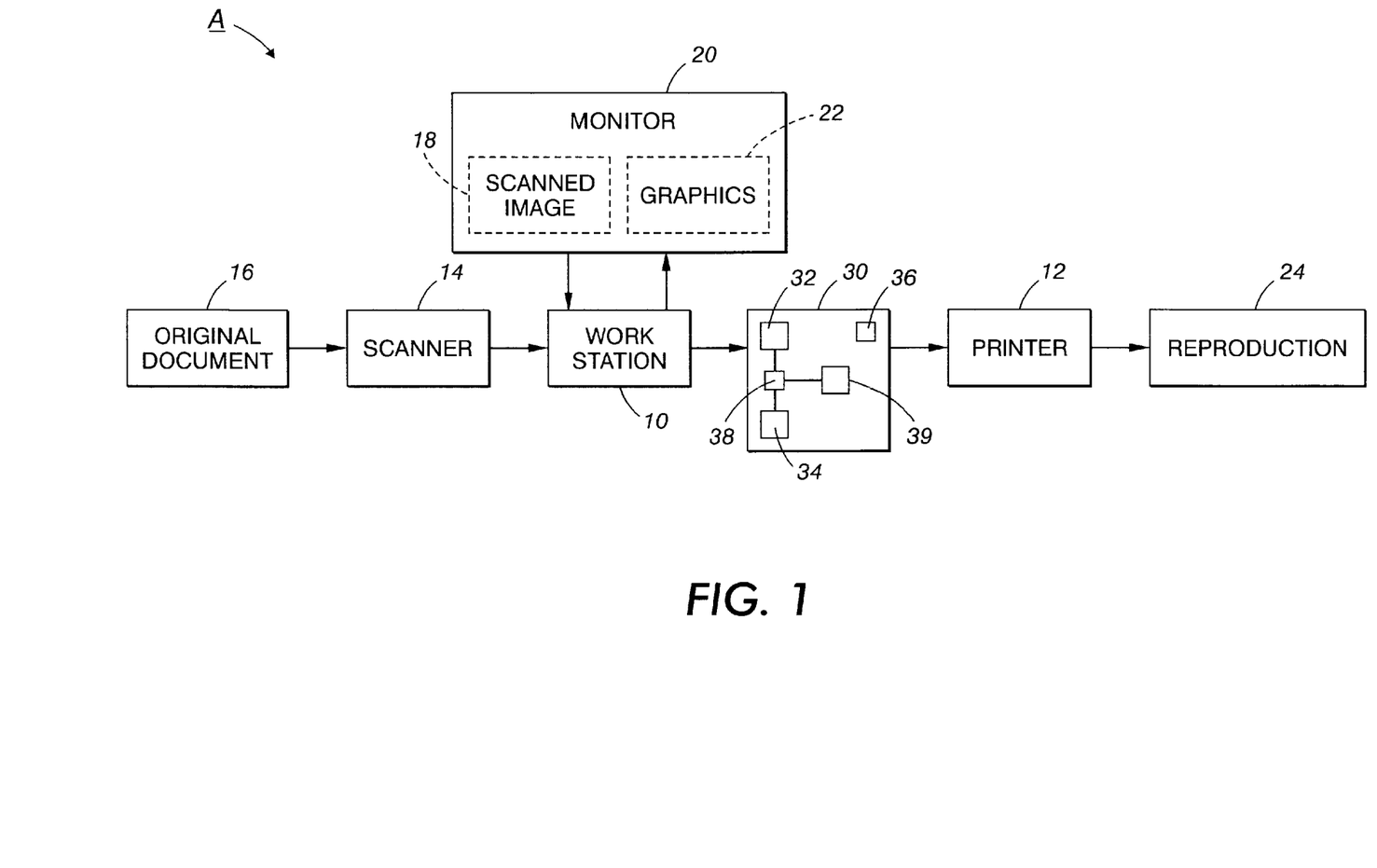
FIG. 1 is a schematic diagram of a scan to print system in which the present invention is advantageously implemented.

With reference to FIG. 1, printing system A in which the present invention finds advantageous use, is shown. The remaining description of the invention will be with reference to such a system where pictorial and graphical signals from a work station 10 are to be transformed through the use of a blended look-up table, and are used by printer 12. It is, however, to be understood that the present invention is applicable to other device-to-device operations, such as scanner-to-scanner, scanner-to-printer, printer-to-printer, or other where weighted values are used in image generation. It is also to be understood that the blended look-up table obtained using the weights generated by the method described in the present invention is applicable to any type of input, such as input signals of unknown type and/or origin.

FIG. 1 illustrates that scanner 14 scans an original document 16, in order to generate image signals representing for example a pictorial image. The image signals are generated by sensing elements which convert light reflected from the original document placed on a copying platen of the scanner. Initially, the image signals are generated in an input format or color space, such as RGB (red-green-blue).

Work station 10 receives image signals, such as RGB signals, representing original document 16 and displays the signals as a scanned image 18, on a monitor 20, such as a CRT. Work station 10 may also be used to add text or graphics 22 thereto which may also be viewed on monitor 20. Printer 12 generates a reproduction 24 of original document 16 with added text or graphics by adding multiple layers of ink or colorant to a printing medium such as paper. Typically, the printer operates in accordance with the set of color signals, such as CMYK (cyan, magenta, yellow, black), in the color space uniquely defined for the printer by its capabilities and colorants. Thus, before printer 12 can operate to generate a reproduction 24 of original document 16 and added graphics 22, the original image signals must be converted into equivalent printer signals.

In printing system A, image signal translator 30 stores printer look-up tables such as pictorial LUT 32 and graphical LUT 34, which map image signals defined in a color space, such as RGB color space to output signals defined in a color space, such as CMYK color space, for an output device. Typically, image signal translator 30 stores the look-up tables in ROM or RAM memory with the look-up tables addressable by image signals.

For RGB format, the look-up table is a three dimensional table since color is defined with three variables. In the RGB format, image signal space can be defined as three dimensional with black at the origin of the three dimensional coordinate system 0, 0, 0 and white at the maximum of the three dimensional coordinate system which, for an 8 bit system, would be located at 255, 255, 255. Each of the three axes radiating from the origin point therefore respectively defines red, green, and blue. In the 8 bit system suggested, there will be over 16 million possible colors. Clearly, there are too many values for a one to one mapping of image signals to printer signals. Therefore, look-up tables consist of a set of appropriate values which allow for interpolation from measured values. Examples of existing interpolation methods include, but are not limited to tri-linear interpolation, tetrahedral interpolation, polynomial interpolation, linear interpolation.

Printer 12 has a limited range or space, defined above as the printer gamut, of colors that it can produce accurately so that a colorimetric match exists between the scanned in colors or CRT phosphors, and the colors that the printer imparts to the printing medium. Printers may have to print saturated colors outside of their gamut, such as those produced by computer-generated graphics. Such saturated colors may be outside the printer gamut and incapable of being correctly translated by the pictorial LUT 32 of image signal translator 30. Accordingly, the graphical LUT 34 is required for translating saturated or graphical image signals. Pictorial LUT 32 is generated by first operating the printer with printer signals selected to cause the printer to print samples on a medium. The color samples are measured to determine a first colorimetric response to the printer signals. The calorimetric response is used to generate a first mapping of colorimetric signals to printer signals. Thereafter, the first measured calorimetric response may be used to generate an additional mapping of calorimetric values to printer signals. Ultimately, a color conversion mapping is generated as a function of the first or additional mappings and stored in a color conversion memory.

The graphical LUT 34 is produced by mapping saturated RGB signals (normalized to be between 1 and 0) to C, M, Y, K printer-signals using the relationship C=1−R, M=1−G, and Y=1−B, though modifications are sometimes required; for example, when printer blue (100%C & 100%M) is too dark and hue shifted. For less than 100% saturated colors, K is determined and CMY are correspondingly decreased using well-known methods. These modifications are made in such a way that RGB between 0 and 1 map to CMYK between 1 and 0.

As described above, the prior art has not been able to achieve high-quality reproductions, without undesirable artifacts and contours, when mixed image signals having both pictorial and graphical characteristics are sought to be printed. Neither the pictorial LUT 32 nor the graphical LUT 34 provides a suitable translation of mixed image signals for printer output. While the pictorial LUT 32 can translate pictorial image signals into printer signals with accurate results, and while the graphical LUT 34 can translate graphical image signals into printer image signals exhibiting saturated colorant, neither the pictorial nor the graphical LUTs individually provide satisfactory translation of mixed image signals to printer signals. A processor 36 may be used in the generation of pictorial LUT 32 and graphical LUT 34, and in the outputting of signals therefrom.

To overcome the shortcomings of the individual pictorial and graphical look-up tables, schemes for developing blended look-up tables have been attempted. However, existing schemes for operating blended look-up tables are implemented using less than desirable or optimal input weights. The present invention addresses this problem by use of weight generator 38 which supplies weighting values for the generation of blended LUT 39, where blended LUT 39 is used by processor 36 to generate desired blended output signals.

In the present embodiment, for each point in the input color space both the input point's position in the printer and monitor gamut are checked and the weights are a function of the input point and percentage of both monitor and printer gamut in which the input point lies. The weights are calculated for each input point and depend non-linearly on the position of the input point in both the monitor gamut and printer gamut and on the relative position of the monitor gamut and printer gamut to each other. While the present technique may be used with any two look-up tables, the following description will be undertaken with preference to pictorial (or photographic)/colorimetric and graphical/saturated look-up tables. Also, the input device gamut is represented by a monitor gamut, whereas the output device gamut is represented by a printer gamut.

Figure 2:
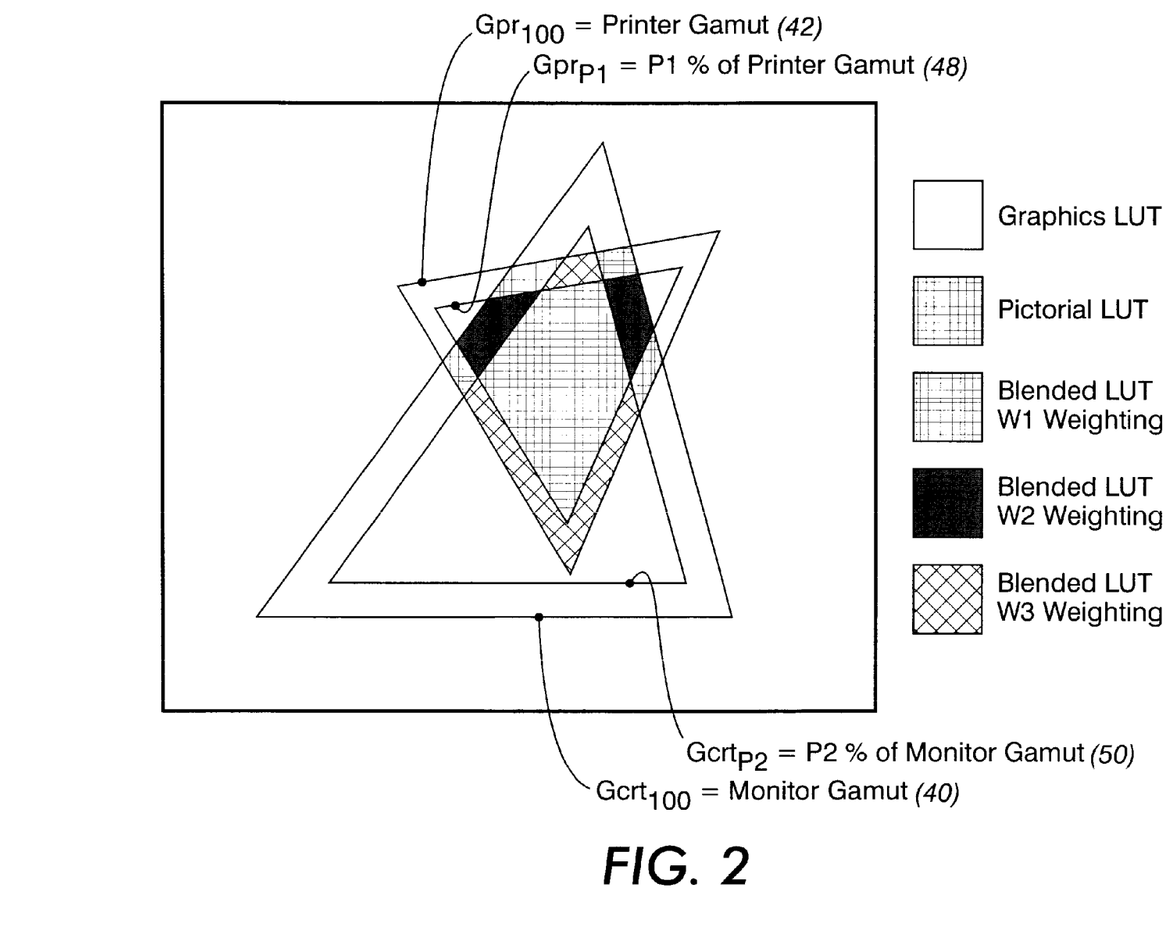
FIG. 2 is a graphical representation of the relationship between a printer gamut and a monitor gamut.

With reference to FIG. 2, a graphical illustration of the inter-relationship between a monitor gamut ($Gcrt_{100}$) 40 and printer gamut ($Gpr_{100}$) 42, as used in connection with an embodiment of the present invention is illustrated. As can be seen, the monitor gamut 40 and printer gamut 42, each have two parts. A first portion which is overlapping and therefore common to both gamuts, and a non-overlapping portion. It is to be appreciated that while monitor gamut 40 is larger than printer gamut 42, there are portions of printer gamut 42 which overlap and extend outside of monitor gamut 40. Previous attempts of generating blended look-up tables have not addressed the overlapping pieces of printer gamut 42 as accomplished in the present invention. Additionally, previous attempts at forming a blended look-up table did not address a layered "onion peeling" approach where the created weights provide small transitions to eliminate noticeable contours and artifacts.

Without the present invention, when going from pictorial LUT 46, and if pictorial LUT 46 is bordering on something not within that gamut, the transition out of that area may cause very dark features and contours which are objectionable. Therefore it is desirable to have a gradual transition from one gamut to the other to avoid undesirable artifacts. A problem is normally found when transitioning between graphics LUT 44 and pictorial LUT 46. Weight generator 38 (FIG. 1) was designed by observing various situations of input points at a certain percentage of the printer gamut and a certain percentage of the monitor gamut and then determining an appropriate weight as that input point is moved through one of the gamuts. In particular, a weight was found, by trial and error, which would provide a smooth transition. Using this information, a function was generated such that when an input position is located in relation to the printer and monitor gamut, the weight value that is applied allows for a smooth transition through the borders of the gamuts.

One observation made by the inventors is that previous weighting algorithms only made transitions at the borders. It was observed that for a smoother transition, when a point is going towards a border, the transition has to begin to occur prior to reaching the border. Therefore, as also shown in FIG. 2, an inner printer gamut ($Gpr_{p1}$) 48 of printer gamut 42 defines a predetermined initial percentage of printer gamut 48. Further, an inner monitor gamut ($Gcrt_{p2}$) 50 is defined as an initial percentage of monitor gamut 42.

As previously discussed, one aspect of the present embodiment is the overlap portion between printer gamut 42 and monitor gamut 40, which in FIG. 2 is shown as being approximately 75% of the gamuts. This percentage is adjustable dependent upon the particular use of the present invention. It is noted that 75% is determined by the printer gamut 42. This is true since it is the printer gamut which is creating a reproduction and it is therefore its characteristics which are limiting to the output color ranges. An overlapping of 75% of the gamuts was selected in this particular instance as it provided as much of pictorial LUT 46 to be usable as possible.

Areas 52 (Blended LUT W1 weighting), 54 (Blended LUT W2 weighting), and 56 (Blended LUT W3 weighting) refine the weighting values which will be supplied to the blended look-up table 36 and correspond to distinct weight calculation equations which are to be used when an input point is found in one of the designated areas.

Figure 3:
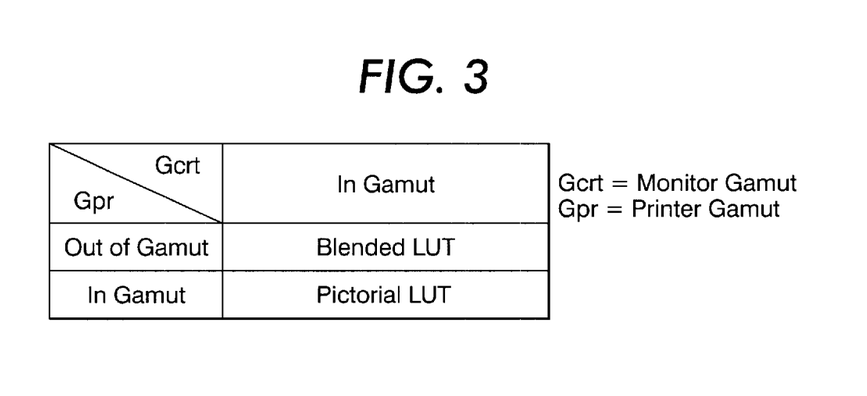
FIG. 3 is a table illustrating unrefined lookup table selections.
Figure 4:
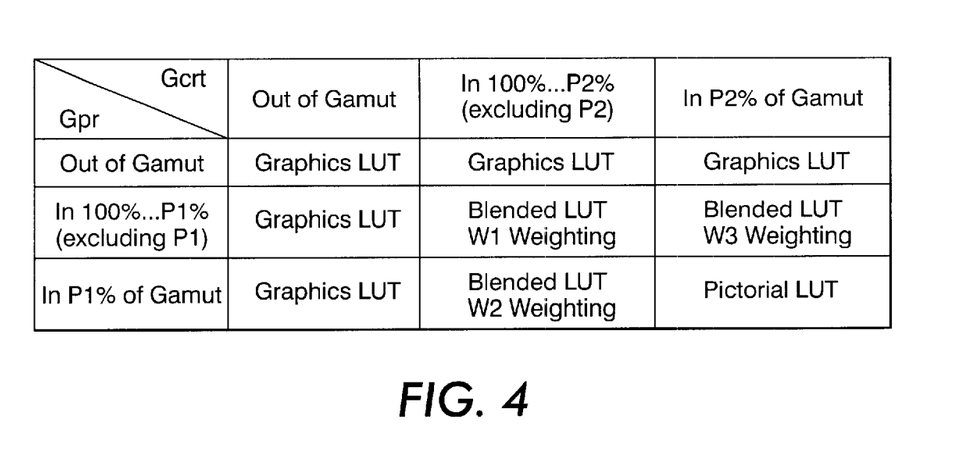
FIG. 4 is a table illustrating refined look-up table selections.

As illustrated by the table of FIG. 3, in previous blended LUT schemes, when it was found that the input point being investigated was within the monitor (or CRT) gamut 40, and was outside of the printer gamut 42, a blended LUT would be used. When it was found the input point was within the monitor gamut 40 and the printer gamut 42 then a pictorial LUT was implemented. As may be noted, a high level of refinement did not exist. On the other hand, in the present invention, as shown in FIG. 4, and where P1 equals the initial percentage of printer gamut (i.e. $Gpr_{p1}$, 48, of FIG. 2); P2 equals the initial percentage of the monitor gamut (i.e. $Gcrt_{p2}$, 50, of FIG. 2) when the input point is found to be out of the monitor gamut, (Out of gamut) then the graphics LUT is used irrespective of where the input point is respective to the printer gamut (Gpr). Similarly, when the input point is found to outside of the printer gamut (Gpr), the graphics LUT is used irrespective of the state of the input point with relationship to the monitor gamut (Gcrt). Further, when it was found
that the input point is in P2 percent of the monitor gamut and within P1 percent of the printer gamut, the pictorial LUT is used.

The table of FIG. 4, further defines that when the input point is anywhere within the CRT gamut through P2 percent (excluding P2) and from 100% to P1 percent (excluding P1) of the printer gamut the first weighting formula (W1) is used.

When the input point is from 100% to P2 (excluding P2) of the monitor gamut and within P1 percent of the printer gamut, then the second weighting formula, W2, is used.

Lastly, when the input point is within P2 percent of the monitor gamut and between 100% and P1 percent of the printer gamut (excluding P1) the third weighting formula, W3, is used.

With particular attention to these formulas, W1, is found by:

$i = \text{ipr} - P1$ $j = \text{icrt} - P2$ $\text{step\_printer} = 100/(100 - P1)$ $\text{step\_crt} = (100 - i \cdot \text{step\_printer})/(100 - P2 - 1)$ $W1 = 100 - i \cdot \text{step\_printer} - (j-1) \cdot \text{step\_crt}$ weight 2, W2, is found by:

$$j = icrt - P2$$

$$step\_crt = 100 \ (100 - P2)$$

$$W2 = 100 - step\_crt$$

and weight 3, W3, is found by:

$$i = ipr - P1$$

$$step\_printer = 100 - P1$$

$$W3 = 100/(100 - i * step\_printer);$$

Where,

P1=initial percentage of printer gamut
P2=initial percentage of monitor gamut
ipr=current printer percentage
icrt=current monitor percentage The foregoing weight calculation methodology set forth above is described as follows:

1. If the input color falls in the intersection of predefined percentages of both gamuts then the pictorial LUT 46 is used and the weight is set to 1.0.

2. If the input color falls outside the monitor and/or printer gamut then the graphics LUT 44 is used and the weight is set to 0.0. If the input color is inside the predefined percentage of the printer gamut and anywhere inside the monitor gamut a weight is calculated according to the position of the input color relative to the monitor gamut.

3. If the input color is inside the printer gamut but outside the predefined percentage of the printer gamut and inside the monitor gamut, a test is used to determine if the input color is in the predefined percentage of the monitor gamut, based on this test:

(i) If it is, a weight is calculated according to the position of the input color relative to the printer gamut.

(ii) If it is not, a weight is calculated according to the position of the input color relative to both the monitor and printer gamut.

Figure 5:
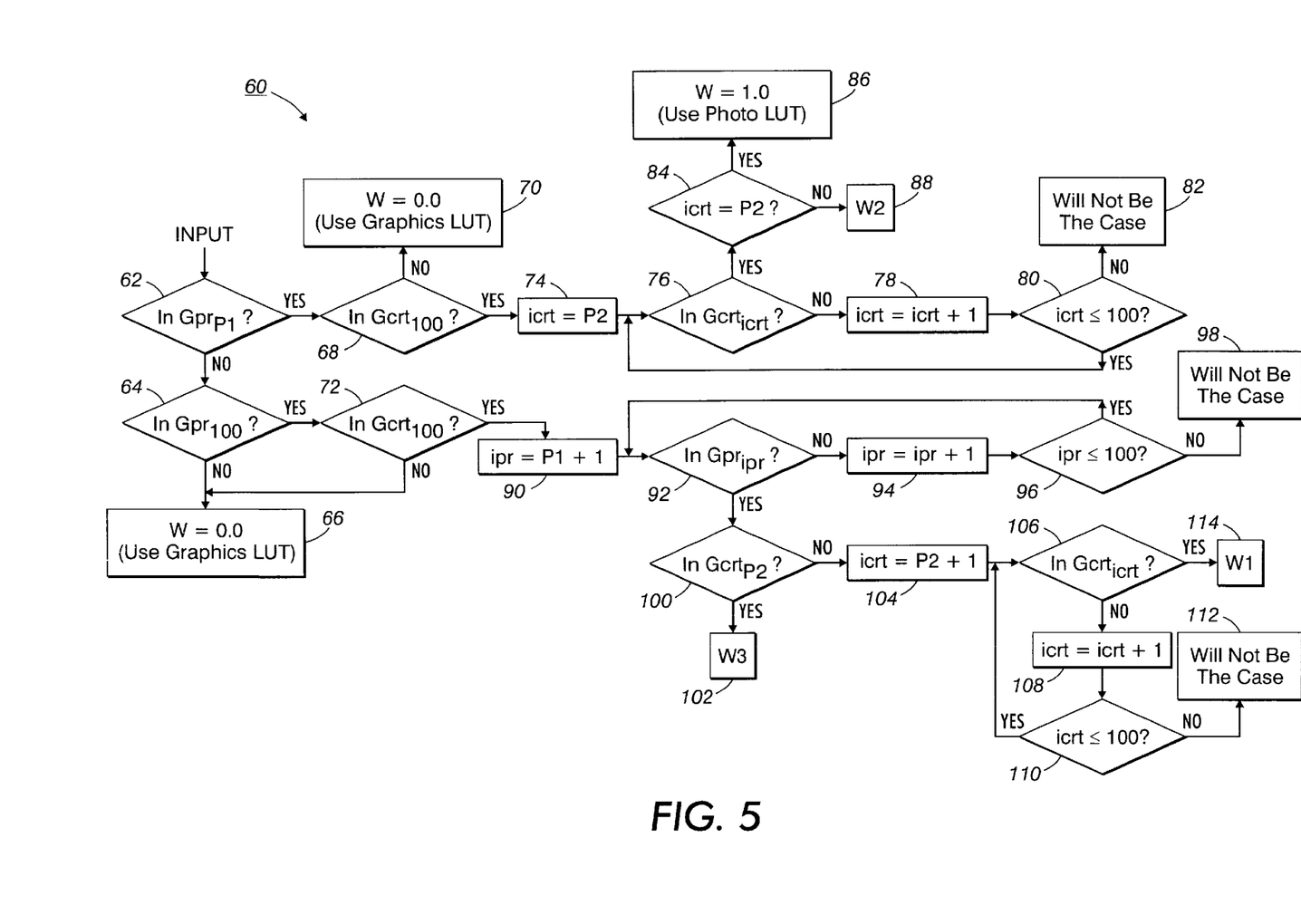
FIG. 5 is a flowchart of a weight calculation algorithm in accordance with the present invention.

Turning to FIG. 5, illustrated is a flow chart showing a weight-building algorithm 60 according to one embodiment of the present invention. Initially, an input point is tested to determine whether the input point is within the initial percentage of the printer gamut ($Gpr_{p1}$) 62. If it is determined the input point is not located within this area, it is next tested as to whether the input point is within the input gamut at all ($Gpr_{100}$) 64. When determined the input point is not within the printer gamut, then a weighting, "W=0.0", is provided and the graphics LUT 66 used.

If in step 62 it is determined the input point is within the initial percentage ($Gpr_{p1}$) a test is made to see if the input point is also within the monitor gamut ($Gcrt_{100}$) 68. When the answer to this inquiry is no, then, again, the graphics LUT is used and the weight is placed at W=0.0, 70.

Returning to step 64, if the output of this block is "yes", a test is undertaken to determine if the input point is also within the monitor gamut ($Gcrt_{100}$) 72. A negative response to this inquiry returns the process to step 66 and the graphics LUT and a weighting of W=0.0 are used.

Returning to step 68, when steps 62 and 68 return positive responses, the current monitor percentage (icrt) is made equal to the initial percentage monitor gamut (P2) in step 74. Step 76 monitors the present location of the input point and steps 78 and 80 are used as increments to determine the relative location of the input point. As noted, step 82 is not a possible operation as the current position of the input point (icrt) cannot be greater than 100% of the monitor gamut ($Gcrt_{100}$). In step 84, if the icrt is found equal to P2, then the pictorial LUT is to be used and a weighting of 1.0 provided 86. When icrt is found not to be equal to P2 84, then a second weight equation, W2, is used 88, to obtain a weight for the blended look-up table.

When steps 64 and 72 provide positive responses, the current printer percentage (ipr) is made equal to the initial percentage of the printer gamut (P1)+1. It is made+1 since it is already known that the input point is not within the initial percentage of the printer gamut. If in step 92, the input point is not within the current percentage of the printer gamut ($Gpr_{ipr}$), an incremental search is made for the relative location of the input point 94, 96. As previously noted, there is not a case where ipr will be greater than 100% of the printer gamut ($Gipr_{100}$), therefore step 98 is a no-operation step. Once the location of the input point in the printer gamut is found if it is determined in step 100 that the input point is equal to the initial percentage of the monitor gamut (P2), then weighting formula, W3 is used 102 to obtain a weight value. If the output of block 100 is negative, then (icrt) is made equal to P2+1 in block 104. In block 106 along with blocks 108 and 110, incrementing of the input position location is obtained. Step 112 is a non-operational step as (icrt) will never be greater than 100% of the printer gamut ($Gpr_{100}$). Lastly, when a positive response is achieved in step 106, then the weighting formula, W1, set forth above will be implemented 114.

It will no doubt be appreciated that the present invention can be accomplished using a software implementation, though a hardware circuit may also be used. It will also be appreciated that the present invention can, further, be implemented through a combination of software and hardware.

The invention has been described with reference to a particular embodiment. Modifications and alterations will occur to others upon reading and understanding this specification. It is intended that all such modifications and alterations are included insofar as they come within the scope of the appended claims or equivalents thereof.

Having thus described the invention, it is now claimed:

1. A method for building weights used in the generation of a blended look-up table (LUT) which translates an image signal having both pictorial and graphical elements, into an output signal, the method for building weights comprising the steps of:

determining a position of a given input point from an input color space for both an input device gamut and an output device gamut;

detecting if the given input point is located in an intersection of predefined percentages of the input device gamut and the output device gamut;

setting a weight of the input point to x when the given input point is located at the intersection of the predefined percentages of the input device gamut and the output device gamut;

detecting if the input point is outside at least one of the input device gamut and the output device gamut;

setting the weight of the input point to y when the given point is outside at least one of the input device gamut and the output device gamut;

determining if the input point is within the predefined percentage of the output device gamut and anywhere inside the input device gamut;

calculating the weight of the input point according to the position of the input point relative to the input device gamut;

determining if the input point is (i) within the output device gamut, (ii) outside a predefined percentage of the output device gamut, and (iii) inside the input device gamut;

testing to determine if the input point is in a predefined percentage of the input device gamut, when it is determined the input point is (i) within the output device gamut, (ii) outside a predefined percentage of the output device gamut, and (iii) inside the input device gamut;

calculating the weight according to the position of the input point relative to the output device gamut, when the testing step determines the input point is in the predefined percentage of the input device gamut; and calculating the weight according to the position of the input point relative to both the input device gamut and the output device gamut, when the testing step determines the input point is outside the predefined percentage of the input device gamut.

2. The method according to claim 1 wherein x is equal to a 1.0 weighting value.

3. The method according to claim 1 wherein y is equal to a 0.0 weighting value.

4. The method according to claim 1 wherein the input device gamut is at least one of a monitor gamut and a scanner gamut.

5. The method according to claim 1 wherein the output device gamut is a printer gamut.

6. The method according to claim 1 wherein a first weight, W1, is obtained by, $$W1=100-i^* \text{step\_printer}-(j-1)^*\text{step\_crt}$$

wherein, $$i=\text{ipr}-P1$$

$$j=\text{icrt}-P2$$

$$\text{step\_printer}=100\ (100-P1)$$

$$\text{step\_crt}=(100-i^*\text{step\_printer})/(100-P2-1)$$

and,

P1=an initial percentage of the printer gamut
P2=an initial percentage of the monitor gamut
ipr=a current printer gamut percentage
icrt=a current monitor gamut percentage.

7. The method according to claim 1 wherein a second weight, W2, is obtained by, $$W2=100-\text{step\_crt}$$

wherein, $$j=\text{icrt}-P2$$

$$\text{step\_crt}=100/(100-P2)$$

and,

P2=an initial percentage of monitor gamut
icrt=a current monitor gamut percentage.

8. The method according to claim 1 wherein a third weight, W3, is obtained by, $$W3=100-i^* \text{step\_printer}$$

wherein, $$i=\text{ipr}-P1$$

$$\text{step\_printer}=100/(100-P1)$$

and,

P1=an initial percentage of the printer gamut
ipr=a current printer gamut percentage.

9. The method according to claim 1 wherein the calculated weights for the input point are calculated nonlinearly, dependent on the position of the input point in at least one of the input device gamut and the output device gamut, and on the relative positions of the input device gamut and output device gamut to each other.

10. A method for generating a blended look-up table (LUT) which translates an image signal having both pictorial and graphical elements, into a output signal, the method comprising the steps of:

generating a graphical LUT for translating a pictorial image signal into a pictorial printer signal;

generating a pictorial LUT for translating a graphical image signal into a pictorial printer signal;

generating the image signal;

selecting at least one of (i) a first pictorial printer signal from the image signal from the pictorial LUT and (ii) a first graphical printer signal from the image signal from the graphical LUT;

generating a weighting values for adjusting at least one of the first pictorial and graphical printer signals, the step of generating the weighting value comprising:

determining a position of a given input point from an input color space for both an input device gamut and an output device gamut;

detecting if the given input point is located in an intersection of predefined percentages of the input device gamut and the output device gamut;

setting a weight of the input point to x when the given input point is located at the intersection of the predefined percentages of the input device gamut and the output device gamut;

detecting if the input point is outside at least one of the input device gamut and the output device gamut;

setting the weight of the input point to y when the given point is outside at least one of the input device gamut and the output device gamut;

determining if the input point is within the predefined percentage of the output device gamut and anywhere inside the input device gamut;

calculating the weight of the input point according to the position of the input point relative to the input device gamut;

determining if the input point is (i) within the output device gamut, (ii) outside a predefined percentage of the output device gamut, and (iii) inside the input device gamut;

testing to determine if the input point is in a predefined percentage of the input device gamut, when it is determined the input point is (i) within the output device gamut, (ii) outside a predefined percentage of the output device gamut, and (iii) inside the input device gamut;

calculating the weight according to the position of the input point relative to the output device gamut, when the testing step determines the input point is in the predefined percentage of the input device gamut; and calculating the weight according to the position of the input point relative to both the input device gamut and the output device gamut, when the testing step determines the input point is outside the predefined percentage of the input device gamut; and generating the blended look-up table by selectively applying the calculated weights to the values of the pictorial and graphical LUTs.

11. An apparatus for blending printer look-up tables (LUT), said apparatus including:
- a first memory which stores a pictorial LUT representative of a pictorial gamut of a printer, for converting first image signals into first printer signals wherein a printing of a first printer signal on the printer comprises a faithful color reproduction of a first image signal;
- a second memory which stores a graphical LUT representative of a graphical gamut of the printer, for converting second image signals into second printer signals wherein a printing of a second printer signal on the printer comprises a saturated color reproduction of a second image signal;
- a weight generator which checks an input point in an input color space to determine a position of the input point relative to a monitor gamut and a printer gamut and relative to positions of the printer gamut and monitor gamut to each other, the weight generator calculating a weight for the input point; and
- a signal processor in data communication with the first and second memories, for generating a blended printer signal as a function of the first and second printer signals and the generated weight of the input point.

* * * * *